Patented Aug. 18, 1931

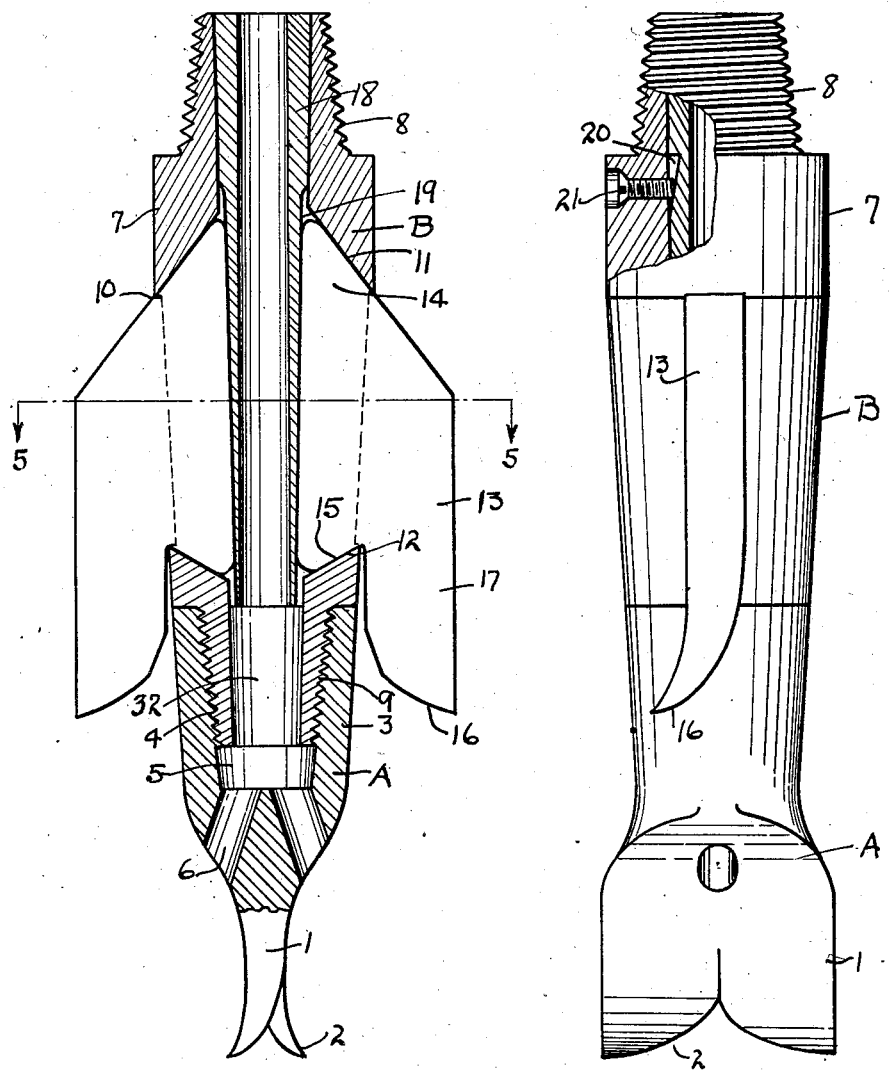

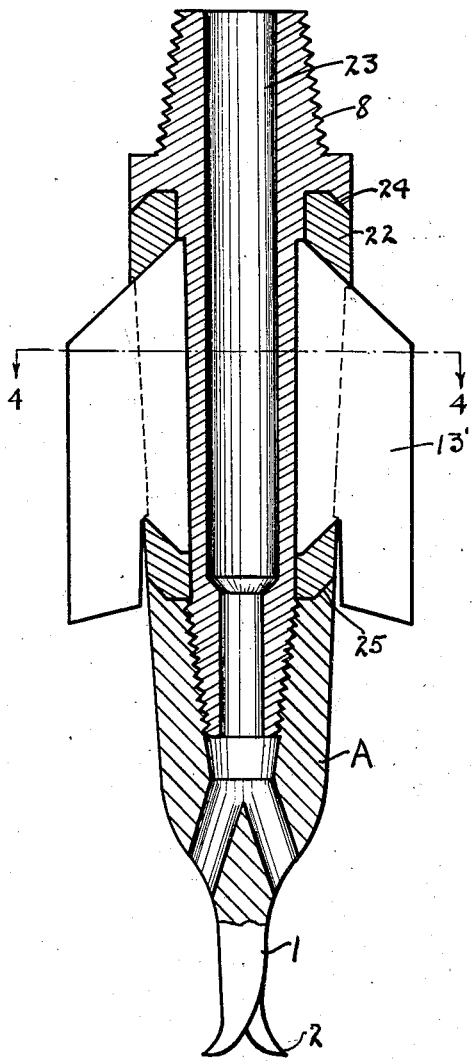
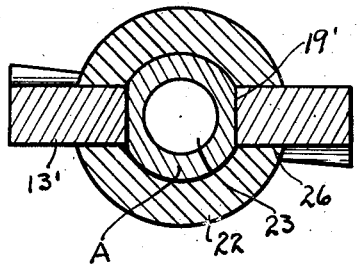
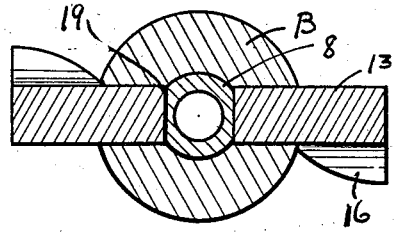

1,819,303

UNITED STATES PATENT OFFICE

WARREN B. REED AND WALTER HEPLER, OF MORGAN CITY, LOUISIANA

MULTIPLE STAGE ROTARY DRILL

Application filed July 2, 1925. Serial No. 41,183.

Our invention relates to rotary earth boring drills employed in drilling wells for water, oil, gas, etc. It pertains more particularly to drills of the fish tail or scraping blade type.

An object of the invention is to provide upon a soft formation drill an arrangement of cutting blades which will have an increased amount of wearing surface thereon, and thus serve to prolong the life of the drill and maintain the gauge of the hole.

Another object is to provide cutters arranged in vertical stages, whereby the forward pilot of smallest diameter serves to center the drill and avoid the drilling of a crooked hole.

It is also desired that a central head of downwardly decreasing diameter be formed upon the drill thus tending to prevent the accumulation of mud and other disintegrated material upon the bit.

It is a further object that the larger cutting blades be made removable, and so formed that they can be quickly and expeditiously changed when dulled, and be again sharpened for use.

In carrying out these and other objects, the invention resides in the form and arrangement of parts which will be brought out in detail in the specification which follows. Referring to the drawings herewith, Fig. 1 is a central longitudinal section through a two-stage drill embodying our invention. Fig. 2 is a side elevation thereof taken at right angles to the Fig. 1 position certain parts being broken away. Fig. 3 is a longitudinal section similar to Fig. 1 illustrating a slightly different form of the invention. Figs. 4 and 5 are transverse sections on the planes 4—4 of Fig. 3 and 5—5 of Fig. 1 respectively. Like numerals of reference are employed to designate like parts in all the views.

In the drawings we have shown the invention employed on drills having cutters arranged in but two vertical stages of different diameters, but it is obvious that any desired number of stages may be employed. There is a small or pilot bit A, of the common fishtail type. It has a lower blade 1 with cutting edges 2. Instead of the customary male shank, we may provide a head tapering downwardly forming a shank 3, which has a threaded socket 4 therein for attachment to the next adjacent stage of the drill, obviously, however, the ordinary shank may be used. The lower end of the socket connects with a small chamber 5 from which two outlet passages 6, 6 discharge flushing fluid upon the opposite sides of the bit.

Above the pilot bit is a head B, tubular in shape, the upper part 7 of which is cylindrical and is provided with a threaded shank 8. Below the cylindrical portion, the head is tapered downwardly to the pilot bit, to which it is connected through the lower pin 9 fitting within the socket 4.

The head B has a plurality of radial slots 10 of uniform width but the upper and lower ends of which are tapered outwardly, as shown at 11 and 12 respectively.

The slots 10 are adapted to receive blades 13 the inner sides of which fit closely within said slots and the blades and slots are formed so that the upper end 14 of the blade may be inserted from the outside first and then the lower shoulder 15 may be hooked over the wall 12. The blade may project beyond the head to any suitable distance and we contemplate the use, with each head, of a plurality of different blades of varying widths by means of which the diameter of the hole may vary. The blades are extended down below the slots and have lower cutting edges 16 and side cutting edges 17 along the side wall of the hole. The lower edge 16 is inclined forwardly in the direction of rotation of the drill, as is the case with the lower bit 1.

The blades 13 are locked in place, when positioned in the slots as described, by a tubular locking mandrel 18. Said mandrel is tapered downwardly on its outer face and the channel 32 through the head B is tapered to receive it. The sides of the mandrel are flattened, as shown at 19, to fit against the inner edges of the blades 13 with which it contacts, to clamp the said blades firmly in position. Under ordinary conditions the mandrel will not tend to become loosened, but a recess 20 may be formed adjacent the upper end to receive a set screw 21 to hold the mandrel against possible movement.

But two stages are shown, but it is to be understood that the number of stages may be multiplied as desired.

In Figs. 3 and 4 a modified embodiment of the invention is shown. The lower fishtail bit A is substantially identical with that previously described. The head B' is, however, constructed to receive an outer sleeve 22 thereon and the central passage 23 is not tapered. The head is reduced in diameter to receive the sleeve 22, and has an undercut shoulder 24 at the upper end below the shank 8.

The sleeve 22 tapers on its outer face to conform to the desired downward taper of the assembled tool. Its lower end may have a bevel 25 to fit against a shoulder upon the bit A. The sleeve has slots 26 therein to receive the blades 13' which are shaped to be held in place by upper and lower shoulders 11' and 12', as in the previous embodiment. The opposite sides of the head are flattened at 19' to fit against said blades. In assembling this form of tool the blades are fitted within the sleeve 22 before the sleeve is fitted over the lower end of the head B'. The sleeve is then placed in position on the head and the lower bit A will act to hold it in position.

The tool thus formed is capable of various changes without departing from the spirit of the invention. It is sometimes desirable that the various stages be spaced apart for greater or less distances, and for this purpose the body of the bit A may be increased in length or a connecting pipe inserted or similar expedients adopted, as may be desired. The parts shown as separate may be made integral if desired. Also we have shown two opposite blades set at right angles to those of the stage below, but we contemplate setting the blades at any angle desired, and may employ various numbers of blades in each stage as may become necessary.

In operation the pilot bit will act to drill a small centering hole and the water discharged in large volume through the passages 6 will carry the material up against the lower edges of the blades 13 of the stage above and carry the disintegrated material with it toward the surface. The tapering of the head, while not a necessary feature, serves to allow the formation to be forced upwardly along its surface without adhering thereto in a most effective manner. The removable blades 13 may be repeatedly sharpened when they become dulled without the necessity of changing the head B, thereby effecting economy in material and time. The dividing of the cutting duty among several stages of cutting elements, as described, will increase the effective cutting points and also the bearing surface against the side walls of the hole, thus insuring a straight hole.

Other advantages will be obvious to those skilled in the art without further description.

What we claim as new and desire to protect by Letters Patent is:

1. A multiple stage earth boring drill comprising a head, a fish tail bit on the lower end thereof, said head having lateral slots decreasing outwardly in length, cutting blades in said slots spaced above said fish tail bit the lower cutting edges thereof extending materially below said slots, and means within said head between said blades to retain said blades in position.

2. A multiple stage earth boring drill comprising a tubular head tapered downwardly and having radial slots therein, a pilot bit on the forward end thereof, detachable blades adapted to be inserted into said slots from the outside, means on said blades engaging said head to limit outward movement thereof in said head and a mandrel fitting within said head and serving to lock said blades in position.

3. A multiple stage earth boring drill comprising a lower fish-tail bit having an upper threaded socket thereon, a hollow downwardly tapered head above said bit having threaded pins at both ends thereof, the lower pin being adapted to fit within said socket; said head having opposite slots therein, the ends of which are tapered outwardly, cutting blades shaped to fit within said slots and to extend below said head, and means within said head adapted to be fixed before said head is mounted to retain said blades in position.

4. A multiple-stage earth boring drill comprising a head, a fishtail bit at the lower end thereof, said head having lateral slots extending longitudinally thereof, cutting blades in said slots adapted to cut a hole of larger diameter than said bit and projecting from said head at an angle relative to said fishtail bit, and separate removable means fitting in said head between opposite blades and coacting with the end walls of said slots to retain said blades in position, said blades having cutting points extending materially below said slots.

5. A drill bit including a body portion, a plurality of elongated openings formed radially in the periphery of said body, said elongated openings the ends of which terminate at points intermediate the ends of said body and extend short of the lower end of said body, a cutting blade having a shank thereon formed for radial insertion into said opening, a cutting face on said blade adapted to extend below said openings, and means carried by said body to retain said blade immovable with respect to said body.

6. A drill bit including in combination upper and lower heads adapted for connection said upper head having a section of reduced diameter, a blade receiving shank arranged for engagement between said heads upon said reduced portion, and blades carried by said shank and adapted to be held therein by said upper head.

7. A drill bit including in combination upper and lower heads adapted for connection, said upper head having a section of reduced diameter, a blade receiving shank arranged for engagement between said heads upon said reduced portion, and blades carried by said shank and adapted to be held therein by said upper head, said reduced portion having flattened areas to contact said blades.

8. A drill bit including in combination a bit head, a plurality of stages of cutting members one of said stages being carried by the lower end of said head, another of said stages comprising vertically elongated blades, adapted to be inserted in the side of said head, radially extending rectangular shaped openings in the side of said head whereby said members may be inserted, lower cutting edges on said blades extending below said openings and means in said head to retain said members.

In testimony whereof we hereunto affix our signatures this 27th day of June, A. D. 1925.

WARREN B. REED.
WALTER HEPLER.